(12) United States Patent  
Sato

(10) Patent No.: US 8,559,130 B2  
(45) Date of Patent: Oct. 15, 2013

(54) DISK LIBRARY APPARATUS

(75) Inventor: Nobuaki Sato, Yokohama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 254 days.

(21) Appl. No.: 13/207,128

(22) Filed: Aug. 10, 2011

(65) Prior Publication Data

US 2012/0039001 A1 Feb. 16, 2012

(30) Foreign Application Priority Data

Aug. 10, 2010 (JP) .................................. 2010-179412

(51) Int. Cl.
*G11B 17/22* (2006.01)
(52) U.S. Cl.
USPC ........................................................ 360/92.1
(58) Field of Classification Search
USPC ........................................................ 360/92.1
See application file for complete search history.

(56) References Cited

U.S. PATENT DOCUMENTS 5,666,337 A * 9/1997 Dang et al. ................. 369/30.66
6,005,734 A * 12/1999 Shimada et al. ................ 360/69
8,239,059 B2 * 8/2012 Thompson et al. ........... 700/214

FOREIGN PATENT DOCUMENTS

JP 2002-133814 5/2002

* cited by examiner

*Primary Examiner* — Mark Blouin
(74) *Attorney, Agent, or Firm* — McDermott Will & Emery LLP

(57) ABSTRACT

A disk library apparatus includes a magazine for housing a plurality of storage disks, a plurality of pallets each having a disk placing surface for placing a storage disk and which are arranged in the magazine so that pallets having different engaging claw shapes are adjacent to each other, and a picker for taking out a pallet selected from the plurality of pallets from the magazine. The picker includes at least one arm for taking out the selected pallet from the magazine in the taking-out of the selected pallet. Each of the at least one arm is, in the taking-out of the selected pallet, engaged with an engaging claw of the selected pallet and in a position shifted from an engaging position with an engaging claw of each pallet adjacent to the selected pallet when seen in a pallet arranging direction.

10 Claims, 14 Drawing Sheets

DISK LIBRARY APPARATUS

CLAIM OF PRIORITY

The present application claims priority from Japanese patent application JP 2010-179412 filed on Aug. 10, 2010, the content of which is hereby incorporated by reference into this application.

BACKGROUND OF THE INVENTION

This invention relates to a library apparatus of disks that stores data, and more particularly, to a disk taking-out structure from a magazine in a disk library apparatus.

As media for storing data, there are known several types of data storage disks such as an optical disk, a magnetic disk, and a magneto-optical disk. Among them, the optical disk is widely used as a removable medium. Known types of optical disks for storing data include a compact disc (CD), a digital versatile disc (DVD), and a Blu-ray disc (BD).

In an industry such as a financial industry, a broadcast industry, or a medical industry, there is a demand for long-time storage of a great volume of data. A storage apparatus for this purpose is preferred to use an optical disk, which is highly reliable for long-time storage of data. A storage capacity of the optical disk has increased with the advancement of technology. However, there is a limit to the amount of data that one optical disk can store.

There is known an optical disk library apparatus as a large-capacity storage system suited for long-time storage of data. The optical disk library apparatus can accommodate a plurality of optical disks, and writes or reads data from each optical disk by an installed optical disk drive.

The optical disk library apparatus includes a magazine for housing the plurality of optical disks. The number of optical disks that the magazine can house is larger than the number of installed optical disk drives. The optical disk library apparatus enables access to all the housed optical disks by conveying the optical disks between the magazine and the optical disk drives.

The optical disk library apparatus is required to accommodate many optical disks in its case. A size of the case is preferred to be small. Thus, the magazine installed in the optical disk library apparatus is desired to be able to house a greater number of optical disks within the limited size.

In the magazine, the optical disks are placed on pallets. In order to convey the optical disk in the optical disk library apparatus, the pallet having the optical disk placed thereon is conveyed between the magazine and an optical disk drive. To increase the number of housed optical disks (to reduce housing space of the optical disks), the pallets are preferred to be thin, and an interval between the pallets is preferred to be small.

However, the small interval between the pallets leads to a difficulty of accurately taking out a target pallet. Thus, an optical disk library apparatus disclosed in Japanese Patent Application Laid-open No. 2002-133814 A accommodates two types of pallets having grips in different positions, and the two types of pallets are alternately arranged in a magazine. When the pallets are seen from a taking-out mechanism, the grips of one type of pallet are located on a right side from a center while the grips of the other type of pallet are located on a left side. The optical disk library apparatus includes two taking-out levers corresponding to the two grips, respectively, and those taking-out levers take out the pallets by catching the corresponding grips.

In the optical disk library apparatus disclosed in Japanese Patent Application Laid-open No. 2002-133814 A, a grip adjacent to one grip in an arranging direction (hereinafter, referred to as vertical direction) of the pallets is not a grip of an adjacent pallet but a grip of a pallet next to the adjacent pallet. This expands a vertical grip interval. As a result, the taking-out lever can have a dimensional margin in shape and structure, and reliability of the catching operation can be improved.

However, the optical disk library apparatus has the following problems. The grips in the different positions are caught by the dedicated taking-out levers, respectively. When one taking-out lever catches the corresponding grip, the other lever operates in a virtual position of the other grip in the same pallet. Normally, there is no grip in this position, and hence the other lever catches no grip.

One taking-out lever catches only one type of a grip, and hence the other lever does not contribute to the taking-out of the pallet. Further, when the vertical position of one taking-out lever shifts from the target grip, the other taking-out lever comes into contact with the grip of the adjacent pallet. With this configuration, therefore, the two taking-out levers shifted from the target positions in the vertical direction take out the adjacent pallet together with the target pallet.

Thus, there is a demand for a more simply-configured disk library apparatus that can more accurately take out only a target pallet from a magazine.

SUMMARY OF THE INVENTION

A disk library apparatus according to an aspect of the present invention comprises at least one disk drive for accessing a storage disk, a magazine for housing a plurality of storage disks to be inserted into the at least one disk drive, a plurality of pallets each having a disk placing surface for placing a storage disk and which are arranged in the magazine so that pallets having different engaging claw shapes are adjacent to each other, and a picker for taking out a pallet selected from the plurality of pallets from the magazine. The picker includes at least one arm for taking out the selected pallet from the magazine in the taking-out of the selected pallet. Each of the at least one arm is, in the taking-out of the selected pallet, engaged with an engaging claw of the selected pallet and in a position shifted from an engaging position with an engaging claw of each pallet adjacent to the selected pallet when seen in a pallet arranging direction.

According to the aspect of this invention, in the disk library apparatus, it is possible to more accurately take out the pallet from the magazine.

The above and other objects, features and advantages of the present invention will become more fully understood from the detailed description given hereinbelow and the accompanying drawings which are given by way of illustration only, and thus are not to be considered as limiting the present invention.

DETAILED DESCRIPTION OF THE PREFERRED EMBODIMENTS

Figure 1:
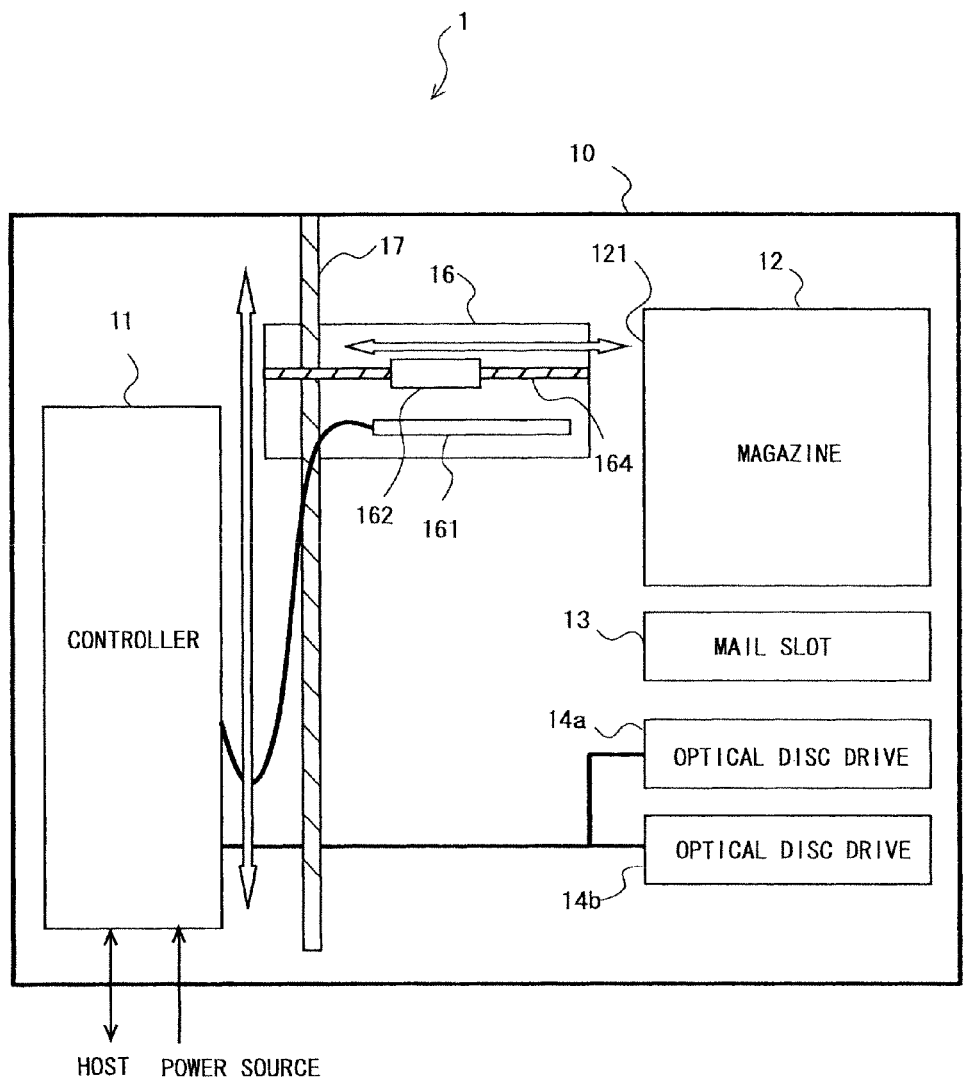
FIG. 1 is a block diagram schematically illustrating an overall configuration of a disk library apparatus according to an embodiment of this invention.

Hereinafter, embodiments of this invention are described. For clarification, some descriptions and drawings below are omitted and simplified as needed. In the drawings, the same elements are denoted by the same reference numerals and, for clarification, repeated description is omitted as needed.

The embodiments have a feature in configuration of taking out a pallet from a magazine in a disk library apparatus. The disk library apparatus takes out the pallet from the magazine by a picker having an arm. The picker takes out the pallet from the magazine by engaging an engaging claw of the arm with an engaging claw of the pallet.

The disk library apparatus according to the embodiments includes at least two types of pallets. The arm is used for taking out any one of the types of the pallets. When housed in the magazine, the pallets of different types have engaging claws for taking-out in different positions. The pallets adjacent to each other in the magazine have different shapes, and engaging claws thereof are in different positions when seen from a pallet arranging direction. When the arm takes out the pallet, the engaging claw of the arm is located so as not to be engaged with the engaging claw of the adjacent pallet when seen from the pallet arranging direction. This reduces a possibility that when taking out a target pallet, the arm may take out a pallet different from the target pallet.

FIG. 1 schematically illustrates an overall configuration of the optical disk library apparatus according to the embodiment. An optical disk library apparatus 1 includes, in a case 10, a controller 11, a magazine 12, a mail slot 13, and optical disk drives 14a and 14b. A picker 16 is installed in the case 10. In FIG. 1, the picker 16 is supported by an elevation shaft 17, and vertically moves along the elevation shaft 17.

The magazine 12 can house a plurality of optical disks. The magazine 12 has an opening 121 facing toward the picker 16. The magazine 12 can house a plurality of pallets, and the optical disk is placed on each pallet. Structures of the magazine 12 and the pallet housed therein are described below.

A user can take out the magazine 12 from the case 10 via an opening (not shown) formed in the case 10, and also load the magazine 12 in the case 10. The user can change the optical disks housed in the magazine with the magazine 12 or change only the optical disks. The magazine 12 may be fixed in the case 10.

The mail slot 13 is used for inserting an optical disk into the optical disk library apparatus 1, and taking the optical disk out therefrom. Generally, a tray of the mail slot 13 is opened or closed according to a user's operation. The user picks up the optical disk on the tray ejected from the case 10, and also places the optical disk on the tray. The tray having the optical disk placed thereon enters the case 10, and the picker 16 puts the optical disk in the magazine 12.

The picker 16 conveys the optical disk in the case 10. In conveyance of the optical disk, the optical disk is placed on the pallet. The picker 16 supports and conveys the pallet having the optical disk placed thereon or a pallet having no optical disk placed thereon. In this configuration example, when the optical disk is placed on the pallet, the optical disk is not fixed to the pallet. The picker 16 can have a mechanism of holding the optical disk on the pallet.

The picker 16 conveys the pallet (optical disk) between the magazine 12 and the optical disk drives 14a and 14b and between the magazine 12 and the mail slot 13. Further, the picker 16 conveys the pallet (optical disk) between the mail slot 13 and the optical disk drives 14a and 14b and between the optical disk drives 14a and 14b.

Between which devices the optical disk and the pallet are conveyed depends on designing of the optical disk library apparatus 1. Both of the pallet and the optical disk thereon or only the optical disk can be inserted into the mail slot 13 or the optical disk drives 14a and 14b.

The controller 11 controls an operation of the optical disk library apparatus 1, and also functions as an interface between an external host and the optical disk library apparatus 1. The controller 11 supplies power from an external power source to other devices such as the picker 16 and the optical disk drives 14a and 14b.

The controller 11 receives a command from a host to control the other devices in response to the command. For example, when the controller 11 receives an access command (access is a broader term of writing and reading) to an optical disk from the host, the controller 11 controls the picker 16 to take out an optical disk designated by the command from the magazine 12, and to insert the optical disk into one (e.g., optical disk drive 14a) of the optical disk drives 14a and 14b.

The controller 11 further transmits a command to the selected optical disk drive 14a to instruct writing or reading of data at a specified address. The optical disk drive 14a writes user data received from the controller 11 in the specified address of the optical disk, or reads the user data from the specified address to transfer the data to the controller 11.

The picker 16 includes a picker controller 161. The picker controller 161 controls motion of the picker 16 according to an instruction from the controller 11. Under control of the picker controller 161, the picker 16 vertically moves along the elevation shaft 17 that is a screw, an arm assembly 162 moves along a moving axis 164 that is a screw.

Figure 2:
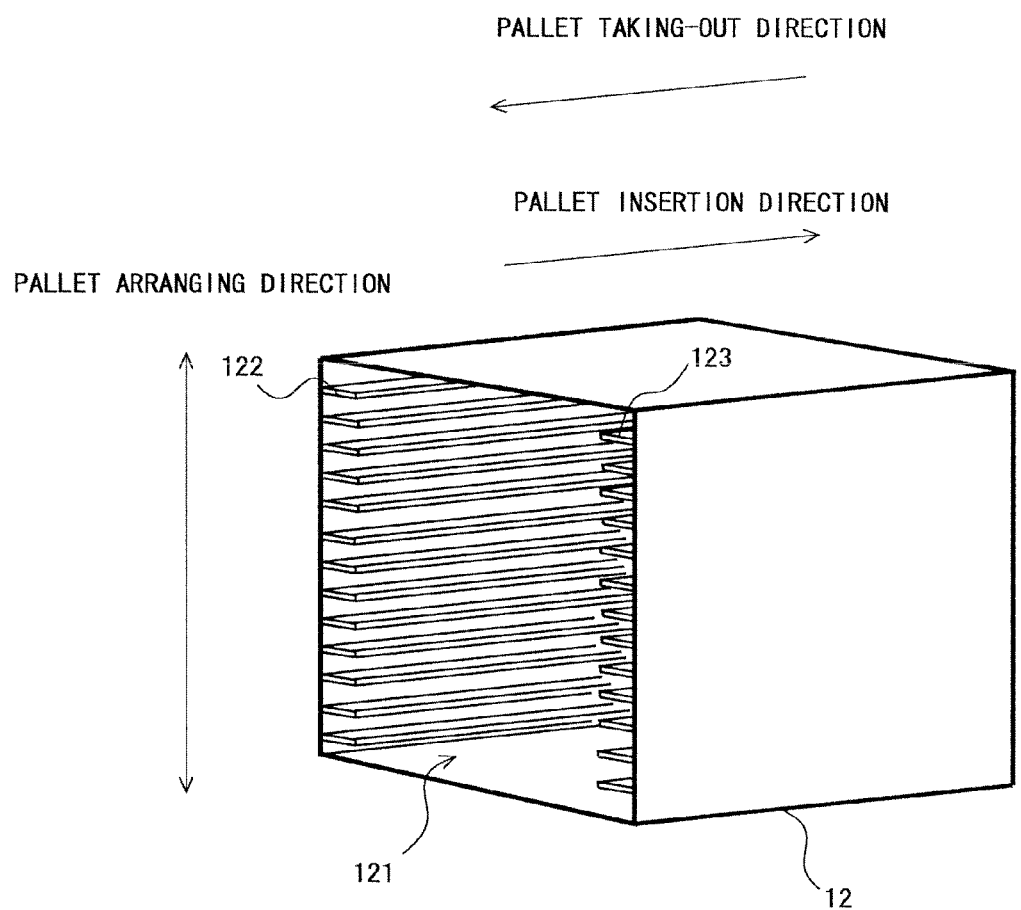
FIG. 2 is a perspective view schematically illustrating a structure of a magazine according to the embodiment of this invention.

FIG. 2 is a perspective view schematically illustrating the structure of the magazine 12. The magazine 12 has the opening 121 on its front face. The arm assembly 162 takes out the pallet (optical disk) from the magazine 12 through the opening 121, and also inserts the pallet (optical disk) into the magazine 12. The magazine 12 includes a plurality of rails in a housing space. The magazine 12 is typically made of a resin.

FIG. 2 designates two exemplary rails by reference numerals 122 and 123. When seen from the magazine front face (opening 121), the rail 122 is formed on a surface on the left inner side, and the rail 123 is formed on a surface on the right inner side. The rails 122 and 123 constitute a pair, and the pallet is placed on the two rails constituting the pair. The rails of the pair are similar in shape, and surfaces on which a pallet is placed are parallel to each other at equal height positions. The rails 122 and 123 extend from the opening 121 to the deep side.

On the surface on the left inner side, a plurality of rails including the rail 122 are vertically arranged. Typically, the rails are similar in shape and equal in interval. Similarly, on the surface on the right inner side, a plurality of rails including the rail 123 are formed. The rails are similar in shape and equal in interval.

The rails constituting a pair has a relationship similar to that of the rails 122 and 123. The structure of the magazine 12 illustrated in FIG. 2 is only an example. A magazine 12 having a different structure can be used. For example, the pallet placing surface of the rail may be inclined in any direction, and the rails of both sides may be coupled to form one shelf plate.

Figure 3A:
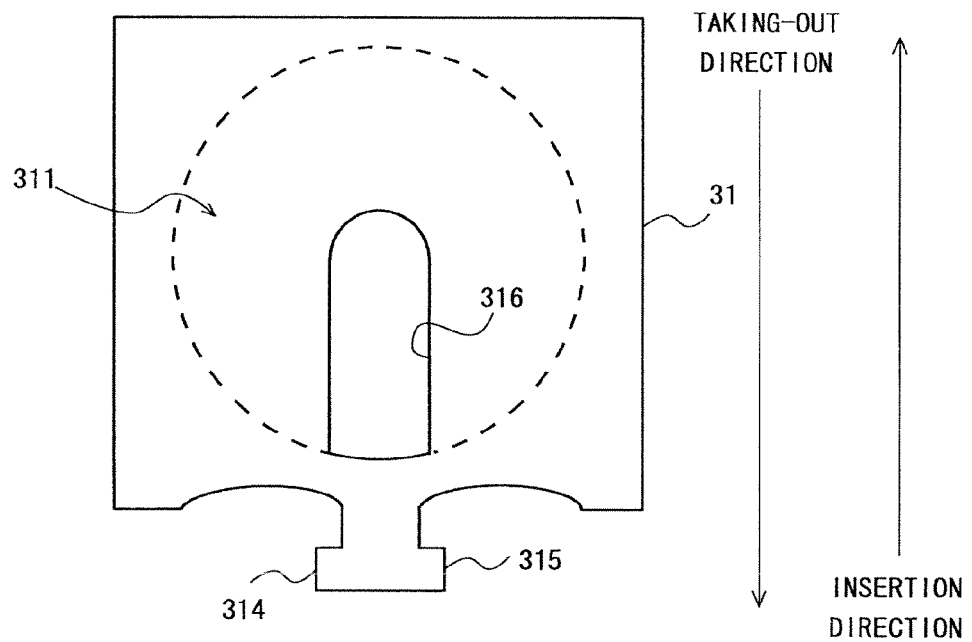
FIG. 3A is a plan view schematically illustrating a structure of a pallet having a first engaging claw shape according to the embodiment of this invention.
Figure 3B:
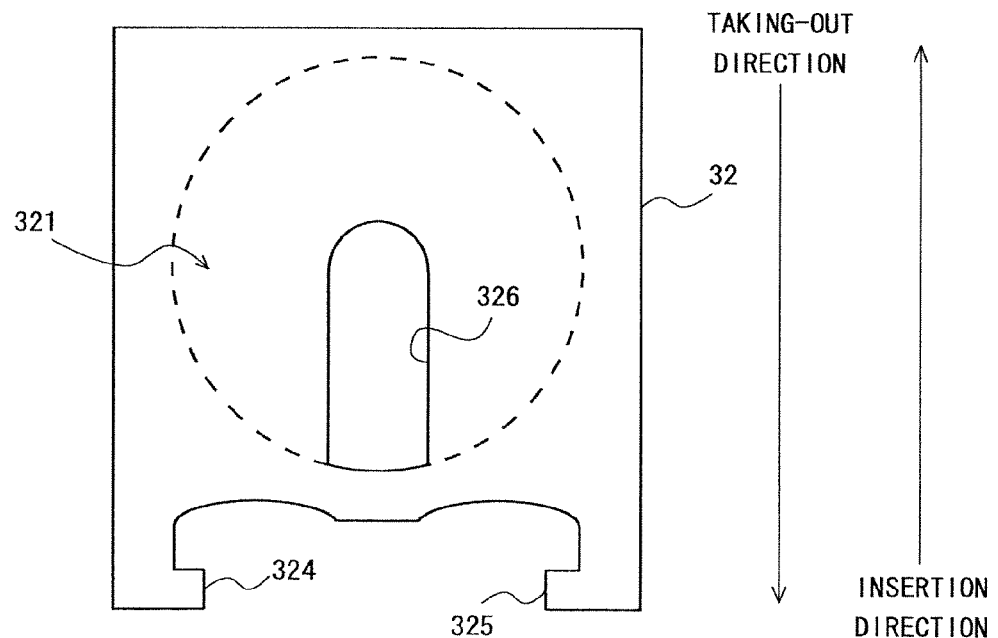
FIG. 3B is a plan view schematically illustrating a structure of a pallet having a second engaging claw shape according to the embodiment of this invention.

FIGS. 3A and 3B are plan views schematically illustrating structures of pallets 31 and 32 according to this embodiment. The pallets 31 and 32 are different in shape. The optical disk library apparatus 1 according to this embodiment uses two types of pallets having different shapes. The pallets 31 and 32 are thin plate-shaped components. The pallets 31 and 32 are typically made of a resin.

Optical disks are placed on optical disk placing surfaces 311 and 321 of the pallets 31 and 32, respectively. The optical disks are placed in positions surrounded with broken-line circles in the optical disk placing surfaces 311 and 321. In FIGS. 3A and 3B, a downward direction is a direction in which the pallets 31 and 32 are taken out from the magazine 12. An opposite direction thereof is a direction in which the pallets are inserted into the magazine 12. Holes 316 and 326 are holes for checking, by the optical disk library apparatus 1, presence and absence of optical disks on the pallets 31 and 32.

Referring back to FIG. 2, in the magazine 12, the optical disk placing surfaces 311 and 321 of the pallets 31 and 32 face up. Opposite surfaces of the optical disk placing surfaces 311 and 321 come into contact with the rail pairs. In FIG. 2, the pallets 31 and 32 are vertically arranged in the magazine 12.

In this configuration example, the pallets 31 and 32 slide on the rail pairs during taking-out or insertion thereof. A taking-out or insertion direction is perpendicular to the pallet arranging direction and is along the rails. An angle between the taking-out or insertion direction and the pallet arranging direction can have a relationship different from the above-mentioned relationship depending on the design of the optical disk library apparatus. In this embodiment, the pallet arranging direction is referred to as a vertical direction, the pallet taking-out or insertion direction is referred to as a back-and-forth direction, and a direction perpendicular to the back-and-forth direction in the optical disk placing surfaces 311 and 312 is referred to as a horizontal direction.

As described above, the optical disk library apparatus 1 according to this embodiment has the feature in taking-out of the pallets 31 and 32 from the magazine 12. Hereinafter, the configuration for taking out the pallets 31 and 32 from the magazine 12 is specifically described. Insertion of the pallets 31 and 32 into the magazine 12 is an operation opposite to the taking-out operation.

As illustrated in FIGS. 3A and 3B, the pallets 31 and 32 have different shapes on their front faces. In this embodiment, a surface on a front side seen from the picker 16 is referred to as a front face. The picker 16 is engaged with claws formed on the front faces of the pallets 31 and 32 to pull out the pallets 31 and 32 from the housing space of the magazine 12. Shapes other than the front face shapes are similar between the pallets 31 and 32.

The pallet 31 illustrated in FIG. 3A includes two engaging claws 314 and 315. On the front face of the pallet 31, the engaging claws 314 and 315 are arranged along the front face and the optical disk placing surface 311. In this configuration example, the pallet arranging direction in the magazine 12 is perpendicular to the optical disk placing surface 311, and hence the engaging claws 314 and 315 are horizontally arranged. The engaging claws 314 and 315 project in the horizontal direction. The engaging claws 314 and 315 horizontally project in opposite directions. The engaging claws 314 and 315 are formed near a center of the front face of the pallet 31.

The pallet 32 illustrated in FIG. 3B includes engaging claws 324 and 325. On the front face of the pallet 32, the engaging claws 324 and 325 are arranged along the front face and the optical disk placing surface 321. In this configuration example, the engaging claws 324 and 325 are arranged in the horizontal direction. The engaging claws 324 and 325 project in the horizontal direction. Projection directions thereof are also opposite. The engaging claws 324 and 325 are formed near left and right edges of the front face of the pallet 32.

The picker 16 is engaged with the engaging claws 314 and 315 to pull out the pallet 31 from the magazine 12. Similarly, the picker 16 is engaged with the engaging claws 324 and 325 to pull out the pallet 32 from the magazine 12.

Figure 4:
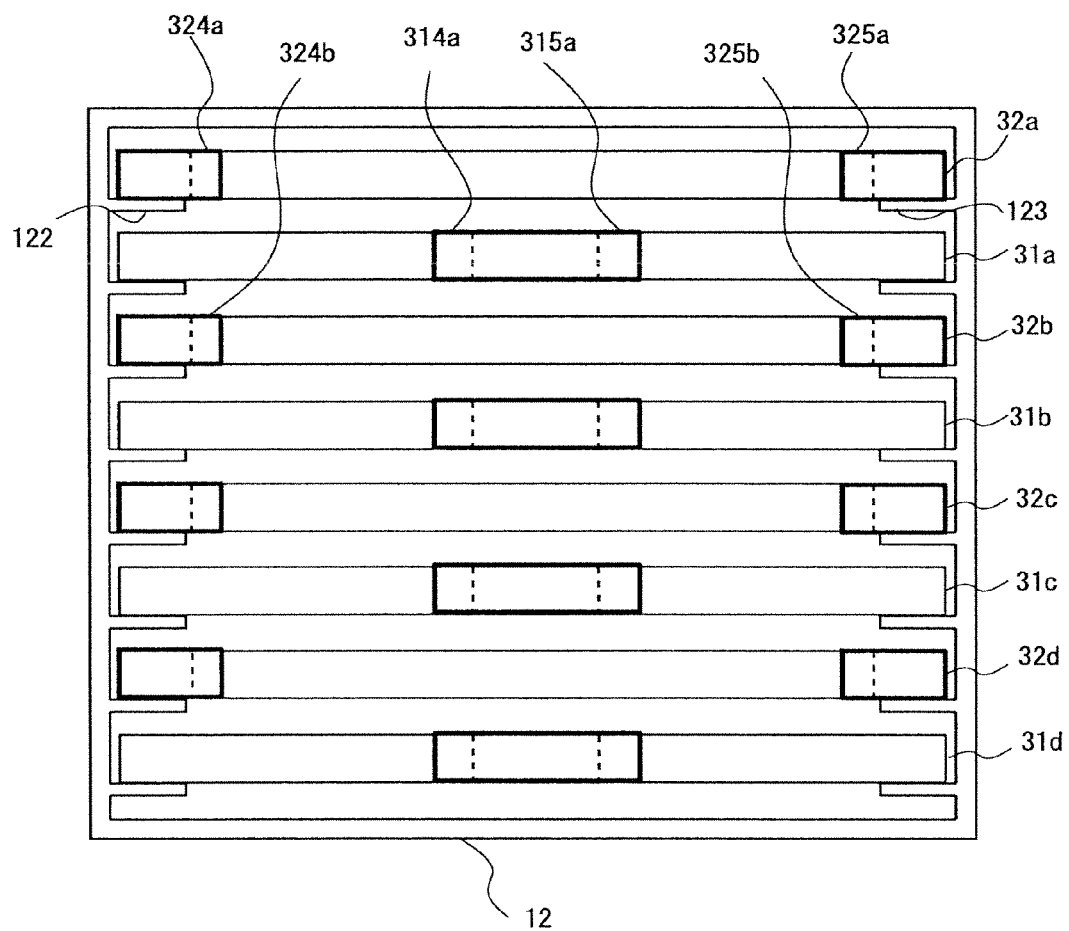
FIG. 4 schematically illustrates pallets housed in the magazine according to the embodiment of this invention.

FIG. 4 schematically illustrates the pallets housed in the magazine 12, and illustrates the magazine front face seen from the picker 16. In an example illustrated in FIG. 4, the magazine 12 can house eight pallets, and pallets 31a to 31d and pallets 32a to 32d are housed in all housing spaces.

The pallets 31a to 31d have shapes similar to one another, each of which has an engaging claw shape of a first type illustrated in FIG. 3A. The pallets 32a to 32d have shapes similar to one another, each of which has an engaging claw shape of a second type illustrated in FIG. 3B. In this embodiment, the pallets of different shapes are alternately arranged. For example, in FIG. 4, the pallet 31a is held between the upper adjacent pallet 32a and the lower adjacent pallet 32b. Even if engaging claw portions of the two pallets are similar in outer shape, when those engaging claw portions are formed in different positions, engaging claw shapes of the two pallets are different.

As illustrated in FIG. 4, when seen in the pallet arranging direction (vertical direction in FIG. 4), an engaging claw of the pallet is not overlapped with that of the adjacent pallet but separated. An engaging claw adjacent to that of one pallet in the pallet arranging direction is an engaging claw of a pallet of a similar shape separated by one.

FIG. 4 designates engaging claws 314a and 315a of the pallet 31a, engaging claws 324a and 325a of the pallet 32a, and engaging claws 324b and 325b of the pallet 32b by the reference numerals in an exemplary manner. When seen in the pallet arranging direction, the engaging claws 314a and 315a of the pallet 31a are located between the engaging claws 324a and 325a of one adjacent pallet 32a, and between the engaging claws 324b and 325b of the other adjacent pallet 32b.

The engaging claws 314a and 315a of the pallet 31a are separated from the engaging claws of the adjacent pallets 32a and 32b without being overlapped with any of them. In the pallet arranging direction, engaging claws (not pallets) adjacent to the engaging claws 324a and 325a of the pallet 32a are the engaging claws 324b and 325b of the pallet 32b.

Generally, in the magazine 12, a housing space for housing one pallet has a margin with respect to a pallet size. Thus, positions of the pallets in the housing spaces are not uniform. However, the above-mentioned relationship is satisfied even when the pallet is housed in any position in the magazine 12.

Figure 5:
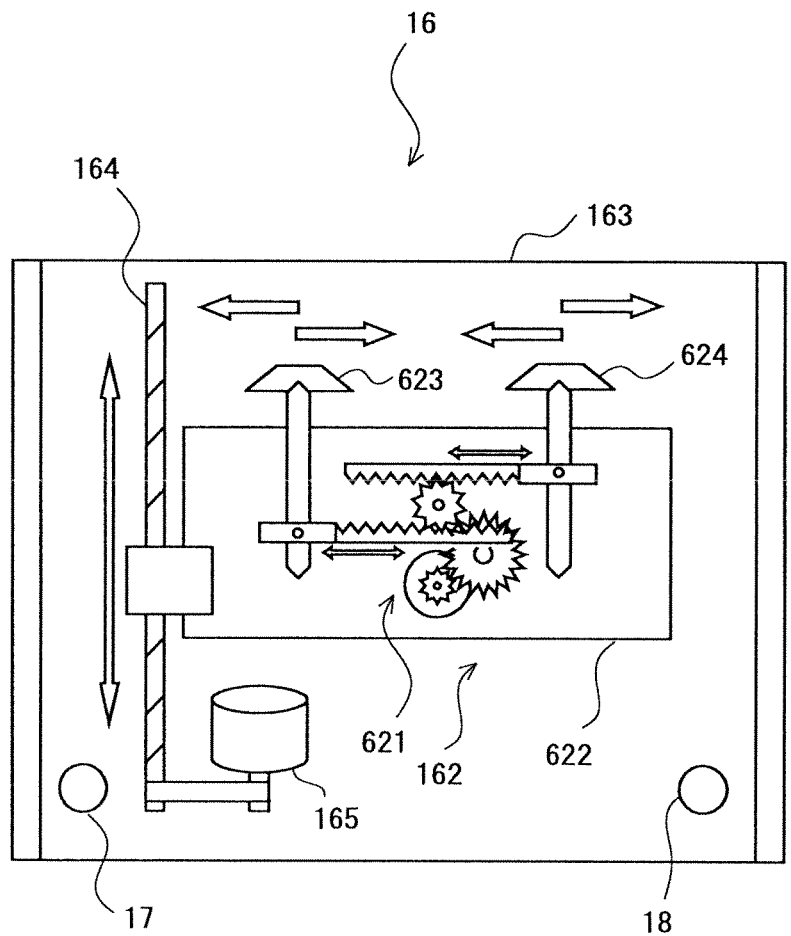
FIG. 5 schematically illustrates a configuration of a picker according to the embodiment of this invention.

Next, referring to FIG. 5, a configuration of the picker 16 is described. FIG. 5 schematically illustrates a configuration example of the picker 16, in which the picker 16 is vertically seen (from upper or lower side). The arm assembly 162 of the picker 16 includes two arms 623 and 624, and an arm driving mechanism 621 for moving the arms 623 and 624. The aim driving mechanism 621 moves the arms 623 and 624 in directions along the pallet front face and the optical disk placing surface. In this configuration example, the arms are moved in the horizontal direction perpendicular to the pallet arranging direction.

The arm driving mechanism 621 moves the arms 623 and 624 in opposite directions. In other words, the arms 623 and 624 move, within a plane, in parallel in directions of approaching or separating from each other. The aim driving mechanism 621 is constituted by components such as a motor, a gear, and a rack. In this embodiment, the arm driving mechanism 621 can employ any configuration, and a simple and compact configuration is preferred.

The arms 623 and 624 and the arm driving mechanism 621 are arranged on an arm support plate 622. The arm support plate 622 that is a component of the arm assembly 162 can move back and forth along the moving shaft 164. The moving shaft 164, which is a screw, is rotated by a motor 165 to move the arm support plate 622 (arm assembly 162). A driving mechanism of the arm support plate 622 can employ any configuration.

Main components of the picker 16 are fixed on a base plate 163. The base plate 163 can vertically move along the elevation shaft 17. A support bar 18 supports the base plate 163 with the elevation shaft 17. As described above, under control of the controller 11, the picker controller 161 illustrated in FIG. 1 controls an operation of the picker 16.

Figure 6:
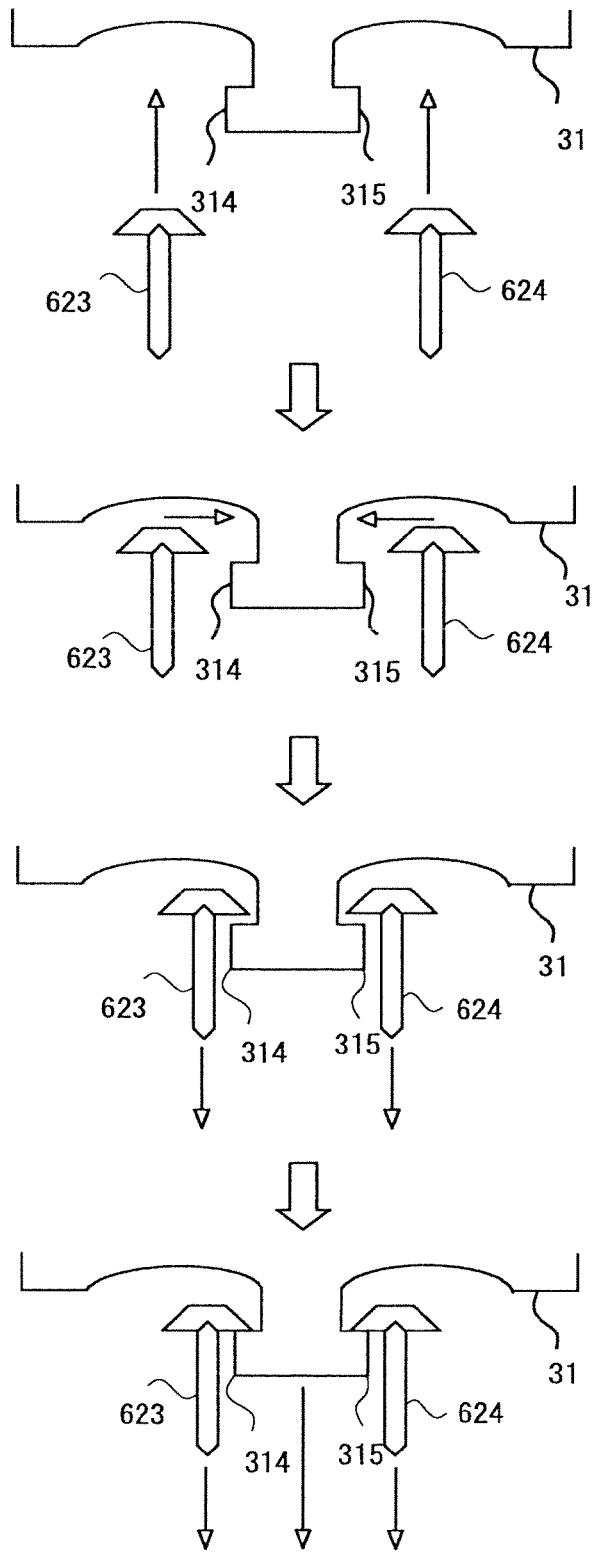
FIG. 6 schematically illustrates movements of arms for taking out the pallet from the magazine according to the embodiment of this invention.

In the taking-out of the pallets 31 and 32, the arms 623 and 624 are engaged with the engaging claws of the pallets 31 and 32 to take out the pallets 31 and 32 from the magazine 12. FIG. 6 schematically illustrates movements of the arms 623 and 624 in the taking-out of the pallet 31 from the magazine 12. The taking-out movements of the arms 623 and 624 coincide with an order of drawings from top to bottom illustrated in FIG. 6.

As illustrated in the top drawing of FIG. 6, the picker 16 vertically moves to position the arms 623 and 624 with respect to the target pallet 31. The arms 623 and 624 are positioned to face the front face of the pallet 31. The controller 11 or the picker controller 161 can position the picker 16 in a preset place or position the picker 16 by using a positioning mark on the magazine 12 or the pallet 31. This is the same in other motions in arm movement control.

An interval between the arms 623 and 624 is wider than that between both ends of the pallet engaging claws 314 and 315. The interval between the arms 623 and 624 is adjusted before or after the arms 623 and 624 are vertically positioned.

The arms 623 and 624 move toward the pallet 31 (movement in pallet insertion direction). Movements of the positioned arms 623 and 624 by the arm driving mechanism 621 are parallel movements within a plane. The interval between the arms 623 and 624 can be adjusted during the movement toward the pallet 31.

As illustrated in the second drawing of FIG. 6, after the arms 623 and 624 have moved by a predetermined distance toward the pallet 31, the arms 623 and 624 stop. The controller 11 then moves the arms 623 and 624 horizontally to reduce the distance therebetween. Typically, the picker controller 161 moves the arms 623 and 624 by preset prescribed distances.

As illustrated in the third drawing of FIG. 6, the arms 623 and 624 stop after horizontal movement of predetermined distances, and move in a direction (pallet taking-out direction) away from the pallet 31. As illustrated in the bottom drawing of FIG. 6, during the movement in the pallet taking-out direction, the arms 623 and 624 come into contact with the pallet engaging claws 314 and 315. The arms 623 and 624 further move in parallel in the pallet taking-out direction to take out the pallet 31 engaged with the arms 623 and 624 from the housing space of the magazine 12.

The pallet 31 pulled out from the magazine 12 by the arms 623 and 624 is placed on the base plate 163 illustrated in FIG. 5 of the picker 16, and conveyed to the other component such as the optical disk drives 14a and 14b or the mail slot 13.

FIG. 6 illustrates the arm movements for taking out the pallet 31. Arm movements for taking out the pallet 32 are roughly similar. In the taking-out of the pallet 32, the horizontal moving direction of the arm movements corresponding to the movements of the second and third drawings illustrated in FIG. 6 is reverse to that of the movements for the pallet 31.

Figure 7A:
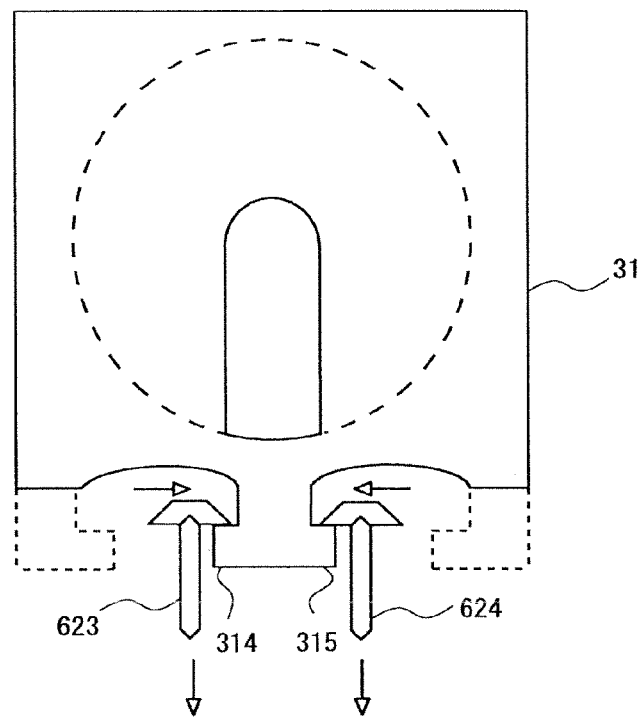
FIG. 7A schematically illustrates the arms that are taking out a pallet of one shape type according to the embodiment of this invention.
Figure 7B:
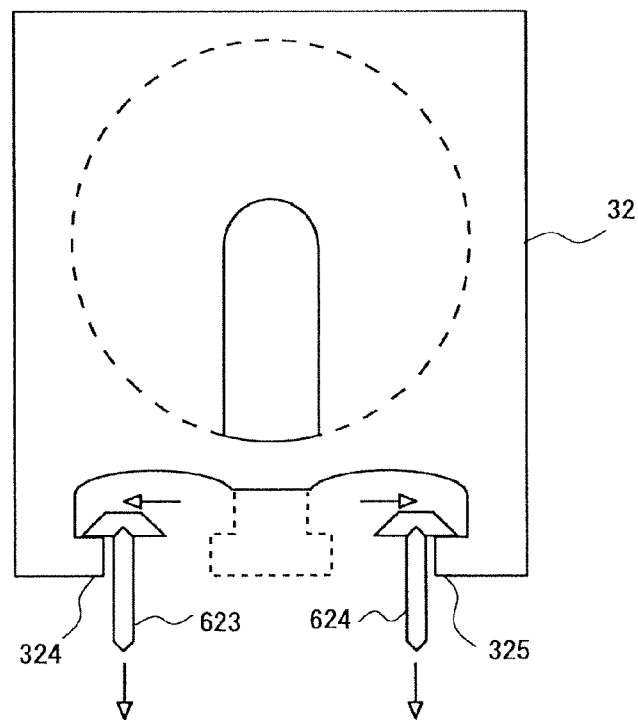
FIG. 7B schematically illustrates the arms that are taking out a pallet of another shape type according to the embodiment of this invention.

FIGS. 7A and 7B schematically illustrate the arms 623 and 624 that are taking out the pallet 31 and the arms 623 and 624 that are taking out the pallet 32, respectively. In FIG. 7A, the arms 623 and 624 are engaged with the pallet engaging claws 314 and 315. In FIG. 7B, the arms 623 and 624 are engaged with the pallet engaging claws 324 and 325. FIG. 7A illustrates the engaging claws of the pallet 32 by broken lines in addition to the pallet 31. Further, FIG. 7B illustrates the engaging claws of the pallet 31 by a broken line in addition to the pallet 32.

FIGS. 7A and 7B illustrate the pallets 31 and 32 when seen from the pallet arranging direction in the magazine 12. As illustrated in FIGS. 7A and 7B, in the magazine 12, when the arms 623 and 624 are engaged with the pallet of one shape type (e.g., pallet 31), even if the aims 623 and 624 shift in the pallet arranging direction, the arms 623 and 624 are not engaged with the pallet of the other shape type (e.g., pallet 32).

Thus, when seen in the pallet arranging direction, while the arms 623 and 624 are in engaging positions with the engaging claws of the pallet of one shape type, the arms 623 and 624 are in positions different from engaging positions with the engaging claws of the pallet of the other shape type. In this embodiment, the positions where the arms 623 and 624 are engaged with the engaging claws of the pallet in the magazine 12 are referred to as engaging positions. When positioned anywhere in a region having a specific width, the arms 623 and 624 are engaged with the engaging claws of each of the pallets 31 and 32. The engaging positions are arbitrary positions in a region having a specific dimension in the vertical direction and the horizontal direction.

As described above referring to FIG. 6, the arms 623 and 624 are positioned with respect to the target pallet to be taken out in the pallet arranging direction, and then moved within the plane in which the pallet has been positioned to pull out the target pallet from the housing space of the magazine 12. As illustrated in FIGS. 7A and 7B, when seen in the pallet arranging direction, during a series of these operations, the arms 623 and 624 are located outside the engaging positions with the engaging claws of the pallet different in shape from the target pallet. Thus, in the taking-out of the pallet, even when the arms 623 and 624 shift in the pallet arranging direction, the arms 623 and 624 can be effectively prevented from taking out the pallet of the different engaging claw shape.

As described above referring to FIG. 4, the pallets different in shape are alternately arranged in the magazine 12. The interval between the adjacent engaging claws in the pallet arranging direction is larger than that of a configuration where the adjacent pallets have engaging claws in the same position. As described above, while the arms 623 and 624 take out the pallet of one shape type (e.g., pallet 31), the arms 623 and 624 are not engaged with the engaging claws of the pallet of the other shape type (e.g., pallet 32). The pallet adjacent to the pallet has a different engaging claw shape. This can reduce a possibility that the pallet of the same shape may be accidentally taken out during the taking-out of the pallet.

Figure 8A:
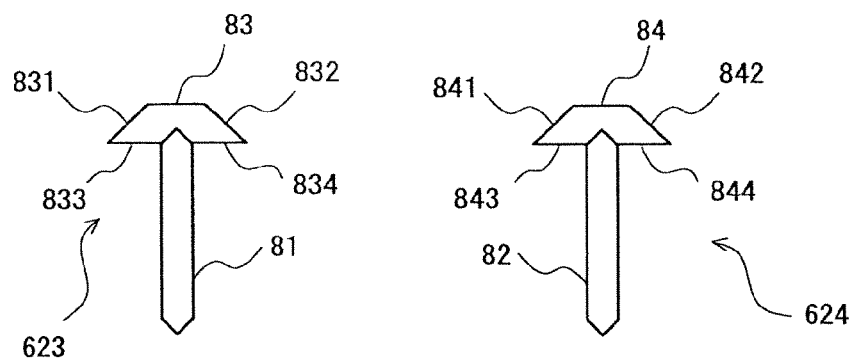
FIG. 8A is an explanatory diagram illustrating shapes of the arms according to the embodiment of this invention.
Figure 8B:
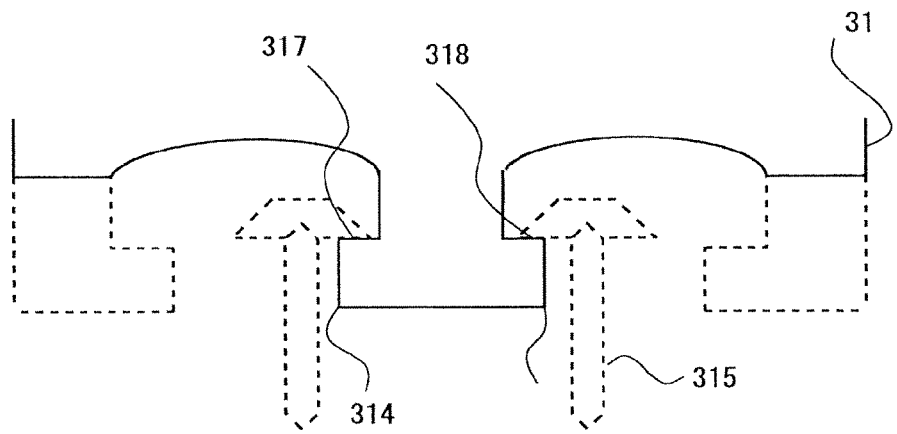
FIG. 8B is an explanatory diagram illustrating an engaging claw shape of a pallet of a first type according to the embodiment of this invention.
Figure 8C:
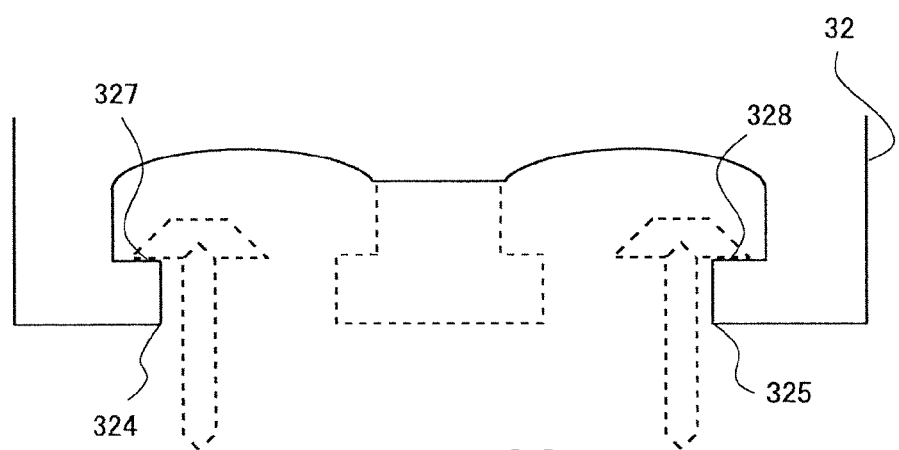
FIG. 8C is an explanatory diagram illustrating an engaging claw shape of a pallet of a second type according to the embodiment of this invention.

Referring to FIGS. 8A to 8C, the shapes of the arms 623 and 624 and the shapes of the engaging claws 314, 315, 324, and 325 are described more in detail. As described above referring to FIGS. 6, 7A, and 7B, in the taking-out of any of the pallets, the arms 623 and 624 are engaged with the target pallet to pull out the pallet from the magazine 12. There is no idle arm during the taking-out of the pallet. As a result, a configuration of the arm assembly 162 is simpler.

As illustrated in FIG. 8A, the arms 623 and 624 respectively include arm shafts 81 and 82 and arm heads 83 and 84. The arm heads 83 and 84 are respectively fixed to leading edges of the arm shafts 81 and 82. Each of the arm heads 83 and 84, which are arm leading edges, includes two engaging claws. Specifically, the arm head 83 includes engaging claws 831 and 832 on the left side and the right side, respectively. The arm head 84 includes engaging claws 841 and 842 on the left side and the right side, respectively. Any component material can be used for the arms 623 and 624. Typically, a metal such as stainless steel or aluminum, or a resin material is used. The arm head and the arm shaft can be integrally formed of the same material.

The arm heads 83 and 84 use different engaging claws in the taking-out of the pallet 31 and the taking-out of the pallet 32. Specifically, as illustrated in FIG. 8B, the arm heads 83 and 84 respectively use, to take out the pallet 31, the arm engaging claws 832 and 841. Meanwhile, as illustrated in FIG. 8C, the arm heads 83 and 84 respectively use, to take out the pallet 32, the arm engaging claws 831 and 842. Thus, each of the arm heads 83 and 84 includes the engaging claws on the left side and the right side, and uses the engaging claws for different types of pallets. This can reduce moving ranges of the arms 623 and 624.

As illustrated in FIG. 8B, in engagement between the arm engaging claws 832 and 841 and the pallet engaging claws 314 and 315, arm engaging surfaces 834 and 843 touch pallet engaging surfaces 317 and 318. Further, as illustrated in FIG. 8C, in engagement between the arm engaging claws 831 and 842 and the pallet engaging claws 324 and 325, arm engaging surfaces 833 and 844 touch pallet engaging surfaces 327 and 328. Thus, in engagement between the arm and the pallet, contact thereof can be surface-contact or point-contact.

The preferred examples of the arm shape and the pallet engaging claw shape have been described, but the arm and the pallet can have shapes different from the examples. For example, the leading edge of the arm head may be curved, and left and right edges of the arm engaging claw may be flat or curved. A contact part of the arm head with the pallet engaging claw may be curved. The left and right arm engaging claws can have different shapes, and the thickness of arm head may not be constant. The left and right pallet engaging claws can have different shapes, and a corner of the pallet engaging claw or the engaging surface with the arm engaging claw may be curved.

Figure 9A:
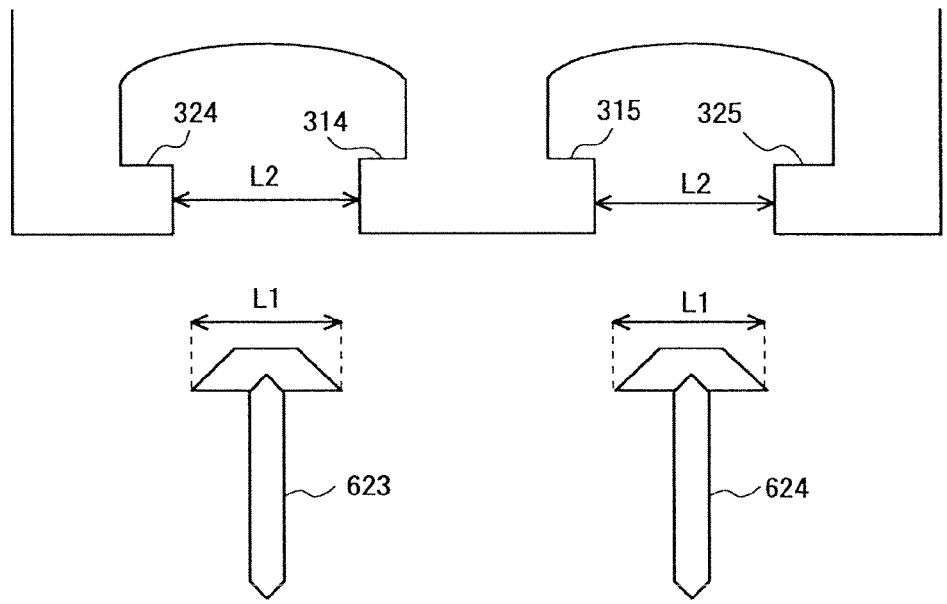
FIG. 9A schematically illustrates dimensions of arm heads and pallet engaging claws when seen from a pallet arranging direction according to the embodiment of this invention.
Figure 9B:
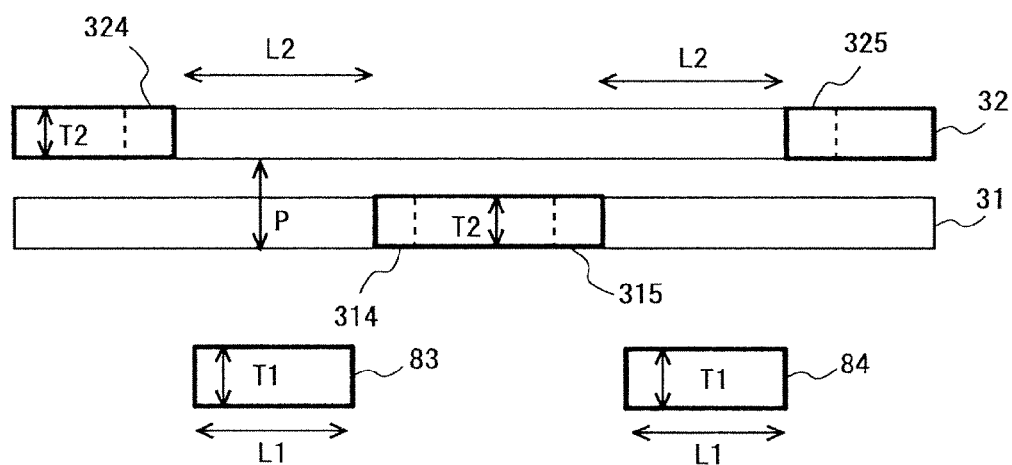
FIG. 9B illustrates dimensions of the arm heads and the pallet engaging claws when seen from a pallet inserting direction according to the embodiment of this invention.

Referring to FIGS. 9A and 9B, a preferred dimension relationship between the arms 623 and 624 and the pallets 31 and 32 is described. FIG. 9A schematically illustrates, when seen in the pallet arranging direction, widths of the arm heads 83 and 84, an interval between the pallet engaging claws 314 and 324, and an interval between the pallet engaging claws 315 and 325. In this configuration example, the arm heads 83 and 84 have equal widths L1. The width L1 is a maximum dimension in the horizontal direction of the arm heads 83 and 84. Intervals between the two pallet engaging claws have equal values L2.

FIG. 9B illustrates dimensions of the arm heads 83 and 84 and the pallets 31 and 32 when seen in the pallet insertion direction. In this configuration example, the arm heads 83 and 84 have equal thicknesses (dimensions in the pallet arranging direction) T1. The pallet engaging claws 314, 324, 315, and 325 (pallets 31 and 32) have equal thicknesses T2. It should be noted that, typically, each of the pallets 31 and 32 is thin at a body center to load the optical disk. In the magazine 12, there is a distance (arranging pitch) P between the adjacent pallets in the arranging direction of the pallets 31 and 32.

In a preferred configuration, the arm head thickness T1 is equal to or larger than the pallet engaging claw thickness T2. This can increase positioning margins of the arms 623 and 624 in the pallet arranging direction in the taking-out of the pallet. The arm head thickness T1 is preferred to be equal to or smaller than 2 P, and more preferred to be equal to or smaller than (2 P-T2). Thereby, the arm heads 83 and 84 appropriately reduces, during the taking-out of the target pallet, a possibility of engagement with the engaging claws of the other pallet.

In a preferred configuration, the interval L2 between the pallet engaging claws is larger than the arm head width L1. This enables, in the taking-out of the pallet, linear movement of the arms 623 and 624 in the pallet insertion direction, and simple movement of the arms 623 and 624. The arm heads 83 and 84 are not brought into contact with the engaging claws of the adjacent pallets, and hence the arm head thickness T1 can be increased.

In a configuration where the interval between the pallet engaging claws is not fixed, a minimum value thereof is the interval L2. Values of the pallet engaging claw intervals can be different between left and right. The arm heads 83 and 84 do not need to be equal in width. The above-mentioned relationship is satisfied between the pallet engaging claw interval and the corresponding arm head width.

In the configuration example, the pallet front face is equal in thickness at the body and the engaging claws. The pallet engaging claws 314, 324 315, and 325 can be different in thickness from the body. A relationship between the thicknesses T1 and T2 and the distance P between the pallets is applied to the pallet engaging claws 314, 324, 315, and 325 and the arm heads 83 and 84. More specifically, the relationship is applied to the thicknesses of the engaging surfaces 833, 834, 843, 844, 317, 318, 327, and 328 illustrated in FIGS. 8A to 8C of the pallet engaging claws and the arm engaging claws. The maximum value of a thickness of the arm head is preferred to be equal to or smaller than 2 P or (2 P-T2).

In the preferred configuration, the picker 16 pulls out the pallets 31 and 32 by using the two arms 623 and 624. This enables, compared with a configuration where the pallets are pulled out only by one arm, more stable pulling-out. Further, in the preferred configuration, the engaging claw shapes of the pallets 31 and 32 are bilaterally symmetrical. In other words, the engaging claw shapes are line-symmetrical at a horizontal center of each of the pallets 31 and 32. As a result, the two arms 623 and 624 can more stably pull out the pallets 31 and 32.

In the preferred configuration, when seen in the pallet arranging direction, the engaging claws 314 and 315 of the pallet 31 are located between the engaging claws 324 and 325 of the pallet 32. The arms 623 and 624 include the engaging claws 831, 832, 841, and 842 on both left and right sides. Thus, the arms 623 and 624 can be engaged with the pallets 31 and 32 by being horizontally moved without being rotated. The arms 623 and 624 can be engaged with the two types of pallets 31 and 32 without being greatly moved horizontally.

Other Embodiments

As described above, the picker is preferred to take out, by the two arms, the pallets from the housing space of the magazine while supporting the pallets in the engaging positions symmetrical left and right. However, the shapes of the picker and the pallet to which this invention is applied may have other structures. For example, the picker may take out the pallet by one arm. The arm heads of the two arms may have shapes asymmetrical left and right, and have different shapes. The left and right gaps between the pallet engaging claws described above referring to FIG. 9A may be different in value.

Figure 10:
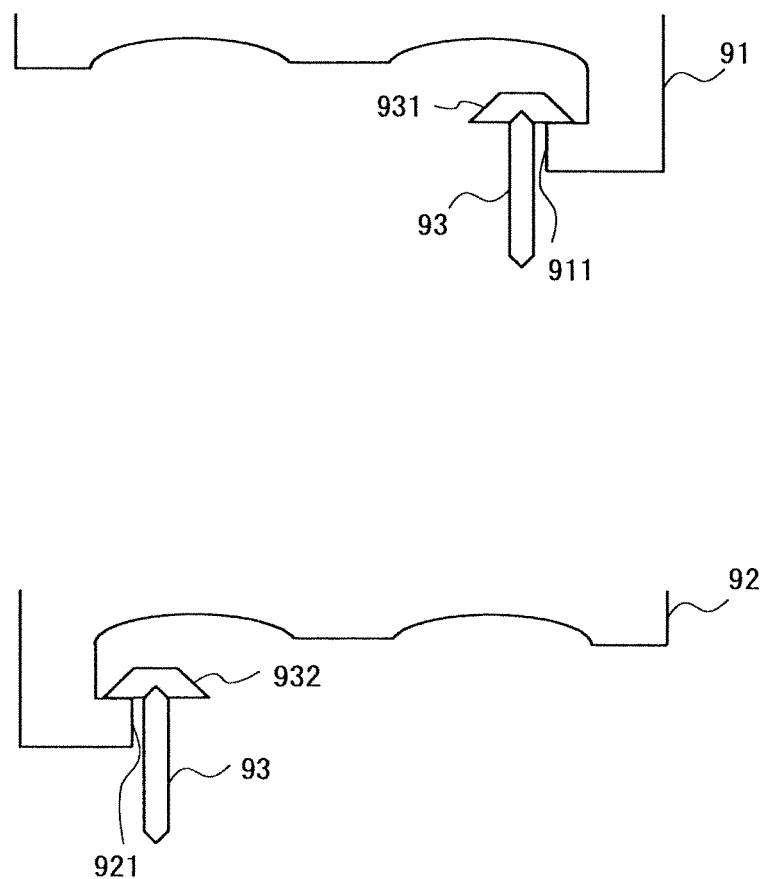
FIG. 10 schematically illustrates a configuration of taking out a pallet by one arm according to another embodiment.

FIG. 10 schematically illustrates a configuration of taking out a pallet by one arm. As compared with the two arms, the taking-out of the pallet by one arm is lower in stability. In this configuration example, pallets 91 and 92 of two different types of engaging claw shapes are alternately arranged. An arm 93 includes engaging claws 931 and 932 on left and right sides, respectively.

The pallets 91 and 92 include engaging claws 911 and 921 on front faces, respectively. The engaging claws 911 and 921 are not overlapped with each other when seen in a pallet arranging direction. An engaging position of the arm 93 with the engaging claw 911 is different from that with the engaging claw 921. Thus, when the aim 93 takes out a target pallet, the arm 93 can take out the target pallet without coming into contact with an engaging claw of an adjacent pallet having a different engaging claw shape.

The arm 93 includes the engaging claws 931 and 932 on both sides, and takes out the pallets 91 and 92 by the engaging claws 931 and 932, respectively. Hence, with a simple configuration, by using a distance between the engaging claws 911 and 921 as a reference, a moving range of the arm 93 can be reduced.

Figure 11:
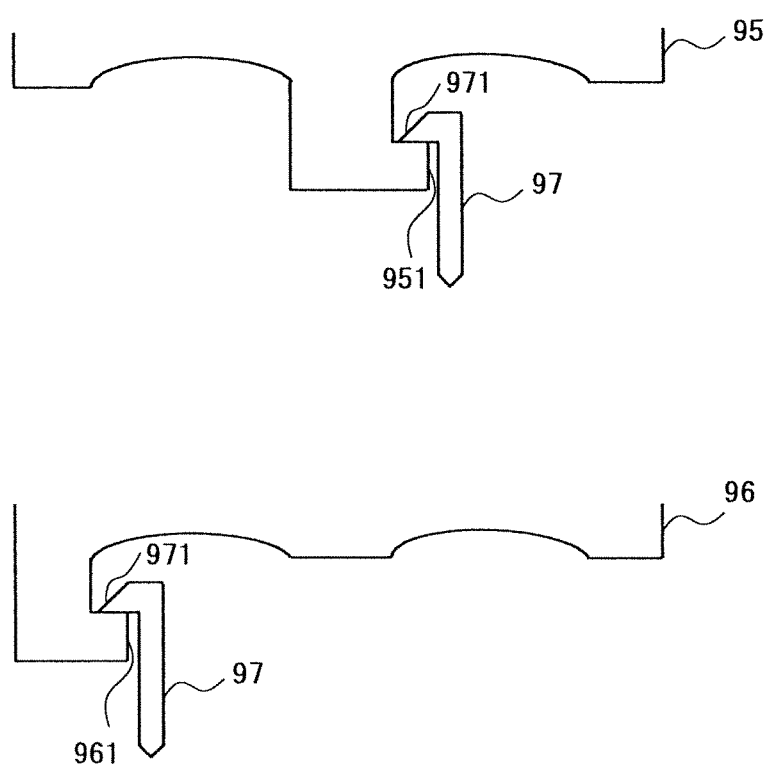
FIG. 11 schematically illustrates another configuration of taking out a pallet by one arm according to still another embodiment.

FIG. 11 schematically illustrates another configuration of taking out a pallet by one arm. In this configuration example, pallets 95 and 96 of two different types of engaging claw shapes are alternately arranged. The pallets 95 and 96 include engaging claws 951 and 961 on front faces, respectively. An arm 97 includes an engaging claw 971 only on one side. Thus, the pallet engaging claws 951 and 961 are similar in projection direction.

The engaging claws 951 and 961 are not overlapped with each other when seen in the pallet arranging direction. An engaging position of the arm 97 with the engaging claw 951 is different from that with the engaging claw 961. Thus, when the arm 97 takes out a target pallet, the arm 97 can take out the target pallet without coming into contact with an engaging claw of an adjacent pallet having a different engaging claw shape.

Figure 12:
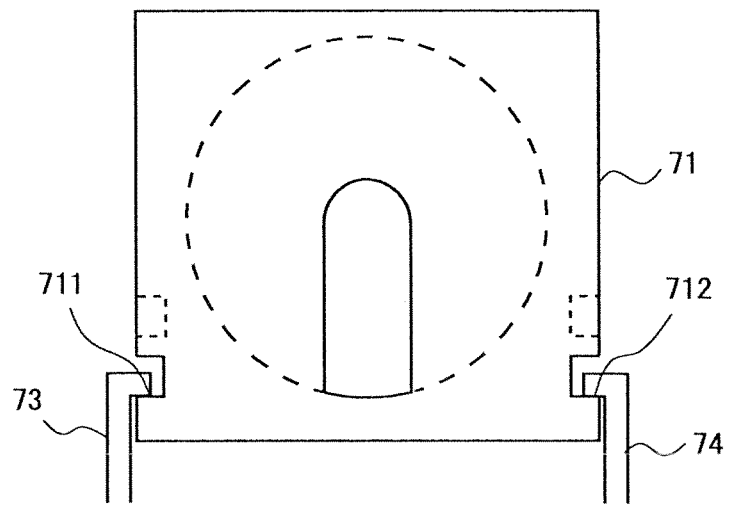
FIG. 12 schematically illustrates pallets each having engaging claws on side faces and arms for taking out the pallets according to further another embodiment.
Figure 12:
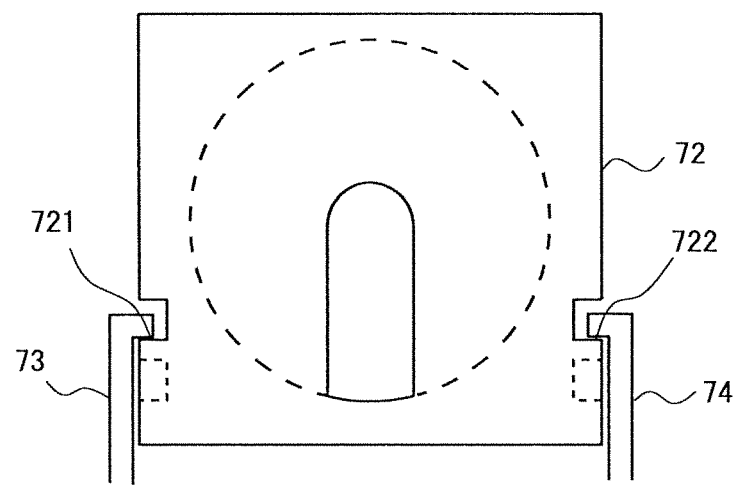

FIG. 12 schematically illustrates pallets each having engaging claws on side faces and arms for taking out the pallets. Pallets 71 and 72 respectively include, on left and right side faces, engaging claws 711 and 712, and engaging claws 721 and 722. Two arms 73 and 74 take out the pallets 71 and 72 from the magazine. In the magazine, pallets of different shape types are alternately arranged.

Engaging positions of the arms 73 and 74 with the pallet 71 are apart from those with the pallet 72 when seen in the pallet arranging direction. Specifically, the engaging positions are shifted from each other in a pallet insertion or taking-out direction. Hence, during taking-out of the pallet, the arms 73 and 74 are not engaged with the engaging claws of an adjacent pallet.

In the configuration illustrated in FIG. 12, the two arms 73 and 74 are engaged with each of the pallets 71 and 72 to take out the pallet from the magazine, and hence the pallet can be stably taken out. The pallets 71 and 72 include the engaging portions on the side faces. This necessitates spaces for inserting the arms 73 and 74 into the magazine or the engaging portions of the pallets 71 and 72 outside the magazine. For this reason, as in the above-mentioned other configurations, the pallet is preferred to include an engaging portion on the front face.

The arms 73 and 74 may include the engaging claws in positions different from leading edges. In the configuration in which the pallets include the engaging claws on the front faces, as described above, the arms are preferred to include the engaging claws at the leading edges (arm heads). As a result, a region necessary in the pallet for engagement with the arms can be reduced.

Figure 13:
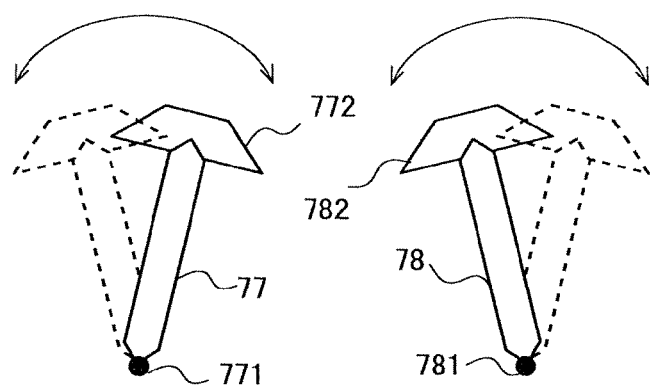
FIG. 13 schematically illustrates arms which are pivoted to move arm heads according to further another embodiment.

In the configuration described thus far, the at ins for taking out the pallets are moved linearly within a plane in which the arms have been positioned. This enables stable and sure engagement between the engaging claws of the arms and the engaging claws of the pallets. Unlike this case, as illustrated in FIG. 13, the picker may pivot the arms to change their positions during taking-out of the pallet. Arms 77 and 78 can pivot around pivot axes 771 and 781 to horizontally move arm heads 772 and 782 (engaging claws) within a plane, respectively.

Figure 14:
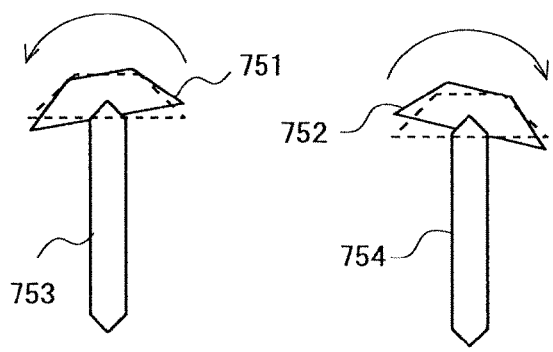
FIG. 14 schematically illustrates arm heads which are biased by springs to pivot according to further another embodiment.
Figure 14:
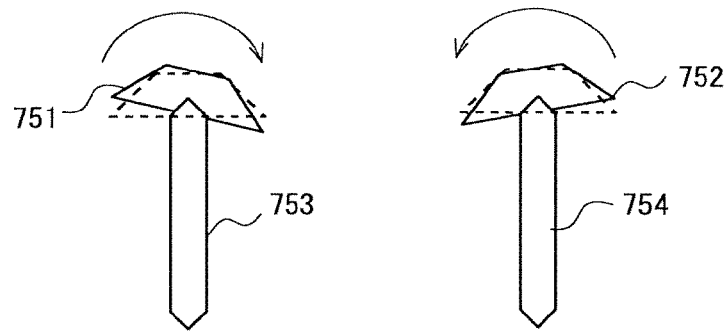

In further another configuration, as illustrated in FIG. 14, arm heads 751 and 752 may pivot around axes on arm shafts 753 and 754, respectively. For example, the arm heads 751 and 752 are supported by springs. When the arm heads 751 and 752 are inserted into engaging positions with the pallet, the arm heads 751 and 752 are pressed to a part of the pallet to pivot from initial positions indicated by broken lines, and then return to the initial positions by elastic forces of the springs. The springs have elastic forces of levels at which the arm heads 751 and 752 do not pivot during taking-out of the pallet. This configuration enables reduction of moving ranges of the arms within the plane in which the arms have been positioned.

Figure 15:
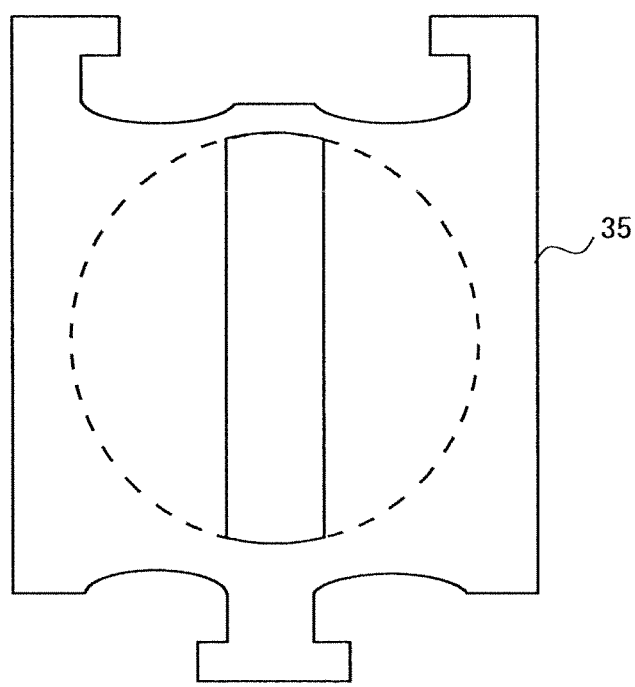
FIG. 15 is a plan view schematically illustrating a shape of a pallet having engaging claws with arms on both front and rear surfaces according to further another embodiment.

FIG. 15 is a plan view schematically illustrating a pallet 35 having further another configuration. The pallet 35 includes engaging claws on both front and rear sides. An engaging claw shape on one side is similar to that of the engaging claw of the pallet 31, while an engaging claw shape on the other side is similar to that of the engaging claw of the pallet 32. By providing engaging claws of two types of pallets arranged in the magazine on the front and rear faces, the pallet 35 can be disposed in an arbitrary position in the magazine.

The optical disk library apparatus 1 uses only a pallet similar in shape to the pallet 35 or together with at least one of a pallet similar in shape to the pallet 31 and a pallet similar in shape to the pallet 32. In the preferred configuration, the picker 16 can operate to change a pallet front and rear direction in the case 10. Thus, the pallet 35 can be inserted into an arbitrary empty space in the magazine 12.

The preferred embodiments of this invention have been described, but this invention is not limited to the specific configurations in the descriptions but includes various modifications and equivalent configurations within the scope of the appended claims.

For example, the optical disk library apparatus may use pallets of at least three types of engaging claw shapes. Also in this configuration, it is important that engaging positions between the arms and the pallets are different between adjacent pallets when seen in the pallet arranging direction. In other words, it is important that the arm engaged with the pallet is shifted from the engaging position with the adjacent pallet. Engaging positions with pallets of all shape types are preferred to be different. However, the arm in an engaging position with one pallet may be in an engaging position with a pallet in a position different from an adjacent position and having a different engaging claw shape.

This invention can be applied to a disk library apparatus that uses storage disks different from the optical disk. The disk library apparatus may use a disk drive that has a function of only one of recording and reproducing. This invention may be applied to a disk library apparatus to be used for any one of the purposes.

There are no particular limitations on the number and materials of components such as the magazine, the mail slot, the optical disk drives, or the picker. For example, the mail slot may be omitted. The moving mechanisms of the picker and the arm assembly may employ configurations different from those described above by referring to the drawings. Typically, the moving mechanism includes a component such as a motor, a solenoid, or a gear. Generally, the pallet arranging direction roughly coincides with an up-and-down direction (vertical direction) in an installation environment of the disk library apparatus. However, the pallet arranging direction may be greatly shifted from the vertical direction as long as the disk can be fixed on the pallet.

What is claimed is:

1. A disk library apparatus, comprising:
    at least one disk drive for accessing a storage disk;
    a magazine for housing a plurality of storage disks to be inserted into the at least one disk drive;
    a plurality of pallets each having a disk placing surface for placing a storage disk, which are arranged in the magazine so that pallets having different engaging claw shapes are adjacent to each other; and
    a picker for taking out a pallet selected from the plurality of pallets from the magazine, wherein:
    the picker includes at least one aim for taking out the selected pallet from the magazine in the taking-out of the selected pallet; and
    each of the at least one arm is, in the taking-out of the selected pallet, engaged with an engaging claw of the selected pallet and in a position shifted from an engaging position with an engaging claw of each pallet adjacent to the selected pallet when seen in a pallet arranging direction.

2. The disk library apparatus according to claim 1, wherein each of the plurality of pallets includes, on a front face, at least one engaging claw to be engaged with the at least one arm.

3. The disk library apparatus according to claim 2, wherein:
    each of the at least one arm moves, to be engaged with the at least one engaging claw of the selected pallet, in a direction along the disk placing surface and the front face of the selected pallet; and
    each of the at least one arm includes engaging claws on both sides in the moving direction, and the engaging claws on both sides are respectively engaged with pallets having different engaging claw shapes.

4. The disk library apparatus according to claim 2, wherein the at least one arm moves linearly, to be engaged with the at least one engaging claw of the selected pallet, in a direction along the disk placing surface and the front face of the selected pallet.

5. The disk library apparatus according to claim 2, wherein:
    each of the at least one arm includes an engaging claw in a leading edge part; and
    a dimension in the pallet arranging direction of an engaging surface of the engaging claw of the each of the at least one arm is equal to or larger than a dimension in the pallet arranging direction of an engaging surface of the at least one engaging claw of the each of the plurality of pallets.

6. The disk library apparatus according to claim 5, wherein the dimension in the pallet arranging direction of the engaging surface of the engaging claw of the each of the at least one arm is equal to or smaller than double a distance between adjacent pallets.

7. The disk library apparatus according to claim 2, wherein:
    each of the at least one arm includes an engaging claw in a leading edge part;
    each of the at least one arm moves, to be engaged with the selected pallet, in a direction along the disk placing surface and the front face of the selected pallet; and
    a dimension in the pallet arranging direction of the leading edge part of the each of the at least one arm is smaller than an interval between engaging claws of adjacent pallets in the moving direction.

8. The disk library apparatus according to claim 1, wherein the picker takes out the selected pallet by using two arms.

9. The disk library apparatus according to claim 8, wherein:
    each of the plurality of pallets includes, on a front face, two engaging claws to be engaged with the two arms; and
    engaging positions of the each of the plurality of pallets with the two arms are line-symmetrical at a center line of the front face.

10. The disk library apparatus according to claim 1, wherein:
    at least a part of the plurality of pallets includes engaging claws on both front and rear sides; and
    the part of the plurality of pallets includes different engaging claw shapes on the front and rear sides.

* * * * *